W. J. PHELPS.
CAN TESTER.
APPLICATION FILED AUG. 13, 1919.
1,344,515. Patented June 22, 1920.
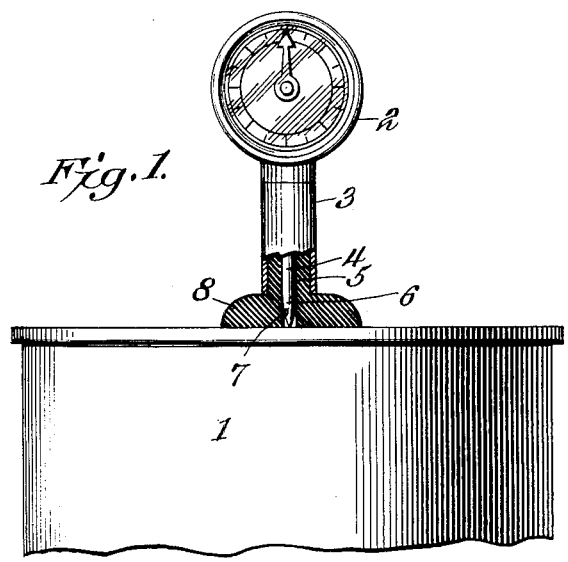
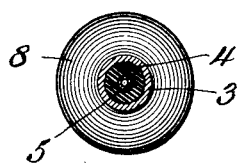
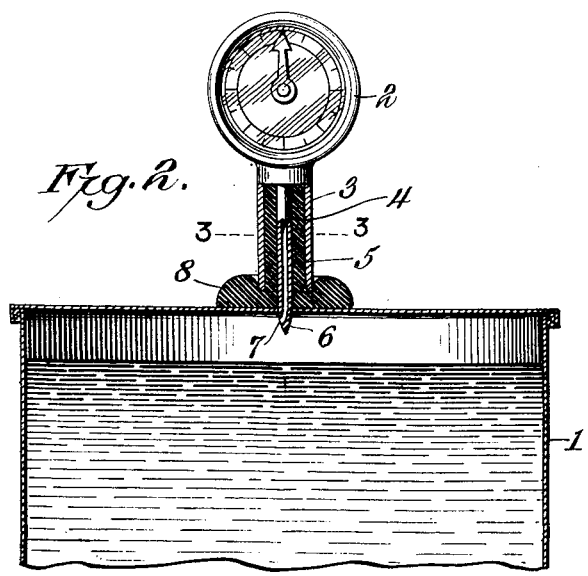
Walter J. Phelps,
INVENTOR,
WITNESSES
Howard D. Ott.
F. T. Chapman.
BY
ATTORNEY

UNITED STATES PATENT OFFICE.

WALTER J. PHELPS, OF BALTIMORE, MARYLAND, ASSIGNOR TO PHELPS CAN COMPANY, OF WEIRTON, WEST VIRGINIA, A CORPORATION OF WEST VIRGINIA.

CAN-TESTER.

1,344,515.

Specification of Letters Patent. Patented June 22, 1920.

Application filed August 13, 1919. Serial No. 317,269.

*To all whom it may concern:*

Be it known that I, WALTER J. PHELPS, a citizen of the United States, residing at Baltimore, State of Maryland, have invented a new and useful Can-Tester, of which the following is a specification.

This invention has reference to can testers, and is designed to provide an instrument of small size whereby cans may be expeditiously tested as to whether they are properly exhausted and sealed and maintain the vacuum conditions produced.

When canned goods, which are usually put up in tin cans, are properly sterilized and sealed they should keep in perfect condition for a long time. However, if either the sterilization or the sealing is imperfect the goods will spoil and produce gases, or air will leak into the can and produce a like effect. If decomposition of the contents of the can has taken place sufficiently superatmospheric pressure is established within the can and one or both heads of the can will bulge outwardly. If decomposition has not progressed far enough to cause a bulging of the head of the can, or a slow leak has occurred at a joint or other sealing point, there is no outwardly visible evidence of the fact. If imperfect sealing is due to faulty construction of the can or to imperfect sterilization, such faults will occur through many cans and if not checked up occasionally may cause the ultimate spoiling of a large pack.

With the invention, which comprises a vacuum gage readily carried in the hand and applied by the hand and so small as to be easily deposited in the pocket, cans may be tested from time to time and the user is apprised of the fact whether or not the can structure or the sterilization is properly completed. In this way the possible spoiling of a few cans out of a very large number of cans is immaterial when compared with the probable spoiling of thousands or millions of cans if the latter have been filled, and sealed but none tested.

When, in the testing of the cans, such testing is performed at the canning factory there need be no loss of good filled cans because the tested cans may be readily resealed in the usual manner of sealing and their contents therefore saved. If, however, the testing instrument be used in a wholesale house or grocery, or in the Government departments, the tested cans of goods would spoil, unless quickly used, the same as any other cans that have been opened.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing—

Figure 1 is an elevation, with some part broken away, showing the tester applied to a can but before the interior of the can is placed into communication with the testing gage.

Fig. 2 is a view similar to Fig. 1 with the can and certain parts of the tester in section and showing the piercing needle or point of the gage projecting into the can.

Fig. 3 is a cross section on the line 3—3 of Fig. 2, but omitting the can.

Referring to the drawing, there is shown a can 1 which may be taken as typical of any suitable sheet metal can, say a tin can, such as is employed for vegetables, fruit, milk, meats and the like. There are two types of cans, as one in which the seams are soldered and another in which seams are turned with paper or other cushioning material constituting gaskets and providing the sealing means.

It sometimes happens that because of some difficulty in the operation or adjustment of the can producing and completing machines air will find its way to the interior of the can after the sterilization and sealing is completed, or the sterilization process is improperly performed, so that in either event spoiling of the contents of the can occurs.

In order to provide for the ready testing of the cans, the testing instrument comprises a vacuum gage 2 mounted on a tubular stem 3 through which there may extend a sleeve 4 of some material such as rubber. Connected to the vacuum gage 2 is a tube 5 longer than the stem 3 or capable of projecting beyond the end of the stem 3. The tube 5 has a pointed end 6 remote from the gage 2, while the bore of the tube 5 opens through one side of the tube 5 in the point 6, as shown at 7, whereby the extremity or piercing end of the point projects beyond the opening or port 7. Carried by the end of the sleeve 5 remote from the gage 2 is a block 8 of flexible material, such as soft rubber. This block normally covers the point 6 but will yield sufficiently to pressure applied to the gage end of the device to permit the forcing of the point 6 through the top of the can to the interior thereof to a sufficient extent to place the gage in communication with the interior of the can through the bore of the tube 5 and the port 7, the block 8 then serving as a cushion seal, preventing any admission of air around the tube 5 to the interior of the can.

The gage 2 is to be taken as typical of any suitable gage for the purpose and not necessarily as confined to a dial gage like that shown in the drawing. A mercury gage or some other form of gage may be substituted for the gage 2, for the invention has nothing to do with the particular construction of the gage but has to do with the device as a whole.

When it is desired to test a can the stem or sleeve 5 and possibly the gage 2 are grasped by the hand of the user and applied to the top of a can resting on a suitable support and the pointed end 6 of the tube 5 is forced through the can, whereupon, if the normal vacuum be present the gage indicates it. If the vacuum is less pronounced than should be or no vacuum at all appears, or super-atmospheric pressure be present, then there is indication of trouble within the can, either that fermentation or putrefaction has set in or a leak has developed without spoiling the goods, but which would ultimately spoil the goods, so that the tested can and possibly the entire batch of canned goods is in an unsatisfactory condition. The tests may be taken at suitable intervals so that the loss from imperfect cans will be kept low, but providing the assurance that the other cans of the batches passing the test are in proper condition.

The device is of simple nature and of inexpensive manufacture and may be made so small as to be readily carried in the pocket, say the vest pocket.

What is claimed is:—

1. A vacuum tester for filled cans of commodities, comprising a piercing tube open at the piercing end, a vacuum gage at the other end of the tube, and yieldable sealing means at the piercing end of the tube for engaging the can to prevent passage of air about the piercing end of the tube.

2. A vacuum tester for sealed cans filled with commodities, comprising a body portion constituting a handle, a vacuum gage at one end of the handle, a piercing tube connected to the gage and traversing the handle to the opposite end thereof and there provided with a piercing point communicating with the gage through the tube, and yieldable sealing means at the piercing end of the tube for permitting the piercing end of the tube to enter the can with the sealing means engaging the can about the piercing point.

3. A vacuum tester for cans filled with commodities and sealed, comprising a tubular body portion constituting a handle, a vacuum gage carried by one end of the handle, a tube extending through the body portion and connected to the gage with the end remote from the gage pointed for piercing the top of the can and provided with a side passage communicating with the interior of the tube, and yieldable sealing means at the pointed end of the tube for engaging the can to seal the tube when piercing the can about the portion of the end of the can traversed by the piercing tube.

4. A testing device comprising a tubular stem, a testing gage connected to the stem, a rubber sleeve within the stem, a tube passing through the sleeve and having one end connected to the gage and the other end provided with a piercing point, and a rubber block carried by the sleeve at the end remote from the gage and having an opening for the passage of said point, the latter being normally covered by the block.

In testimony that I claim the foregoing as my own, I have hereto affixed my signature.

WALTER J. PHELPS.